United States Patent [19]
Johnston et al.

[11] Patent Number: 4,760,296
[45] Date of Patent: Jul. 26, 1988

[54] CORONA-RESISTANT INSULATION, ELECTRICAL CONDUCTORS COVERED THEREWITH AND DYNAMOELECTRIC MACHINES AND TRANSFORMERS INCORPORATING COMPONENTS OF SUCH INSULATED CONDUCTORS

[75] Inventors: Don R. Johnston, Ballston Spa; Mark Markovitz, Schenectady, both of N.Y.

[73] Assignee: General Electric Company, Schenectady, N.Y.

[21] Appl. No.: 634,331

[22] Filed: Jul. 25, 1984

Related U.S. Application Data

[63] Continuation-in-part of Ser. No. 296,071, Aug. 25, 1981, abandoned, which is a continuation-in-part of Ser. No. 145,947, May 2, 1980, abandoned, which is a continuation-in-part of Ser. No. 61,700, Jul. 30, 1979, abandoned.

[51] Int. Cl.[4] .......................... H02K 15/12; B32B 9/00
[52] U.S. Cl. ...................................... 310/45; 174/127; 428/372; 523/457; 310/196
[58] Field of Search ............. 174/110 SR, 127, 121 A, 174/137 B; 264/272.19; 310/45, 196, 43, 208; 428/372, 379, 395; 523/457

[56] References Cited

U.S. PATENT DOCUMENTS

| | | | |
|---|---|---|---|
| 2,888,424 | 5/1959 | Precopio et al. | 260/41 |
| 3,228,883 | 1/1968 | di Gulio et al. | 252/63.2 |
| 3,535,289 | 10/1970 | Kato | 260/78.4 |
| 3,688,137 | 8/1972 | Filhol | 310/45 |
| 3,697,467 | 10/1972 | Haughney | 260/296 TA |
| 3,742,084 | 6/1973 | Olyphant, Jr. et al. | 423/379 |
| 3,812,214 | 5/1974 | Markovitz | 260/830 |
| 4,001,128 | 1/1977 | Penneck | 174/137 B |
| 4,102,851 | 7/1978 | Luck et al. | 260/37 EP |
| 4,107,355 | 8/1978 | Merchant et al. | 260/33.2 R |
| 4,215,031 | 7/1980 | Payne | 428/331 |
| 4,255,471 | 3/1981 | Boldebuck et al. | 428/395 |
| 4,493,873 | 1/1985 | Keane et al. | 428/372 |
| 4,503,124 | 3/1985 | Keane et al. | 428/372 |
| 4,537,804 | 8/1985 | Keane et al. | 427/118 |
| 4,546,041 | 10/1985 | Keane et al. | 428/372 |

*Primary Examiner*—Patrick R. Salce
*Assistant Examiner*—D. L. Rebsch
*Attorney, Agent, or Firm*—Jerome C. Squillaro

[57] ABSTRACT

Resinous compositions used as electric insulation have unique corona-resistance increased from 10- to 100-fold or more by the addition of organoaluminate, organosilicate or fine alumina or silica of critical particle size, and dynamoelectric machines and transformers incorporating coils made of wire strands coated with these novel compositions consequently have substantially increased service lives.

17 Claims, 4 Drawing Sheets

Fig_2_

CORONA-RESISTANT INSULATION, ELECTRICAL CONDUCTORS COVERED THEREWITH AND DYNAMOELECTRIC MACHINES AND TRANSFORMERS INCORPORATING COMPONENTS OF SUCH INSULATED CONDUCTORS

This application is a continuation-in-part of U.S. patent application Ser. No. 296,071 filed Aug. 25, 1981, which is a continuation-in-part of U.S. patent application Ser. No. 145,947 filed May 2, 1980 which is a continuation-in-part of U.S. patent application Ser. No. 061,700 filed July 30, 1979 (all now abandoned).

BACKGROUND OF THE INVENTION

This invention relates to corona-resistant resins and films, to electrical insulation systems wherein such corona-resistant resins and films are used, to components of dynamoelectric machines and transformers insulated thereby, and to the machines and transformers incorporating them.

Resin compositions are generally understood to be relatively low-molecular weight materials that, on heating or addition of hardener, are converted to high-molecular weight solids having useful properties. Another general class of polymeric (that is, plastic) materials is understood to be thermoplastic. These thermoplastic materials are generally handled in their high-molecular weight state. Thermoplastic materials exhibit good solubility in solvents, while cured thermosetting resins are insoluble. Many thermoplastic materials also soften and flow when heated, while thermosetting plastics may soften but do not flow when heated. Both cured thermosetting resins and thermoplastic films are employed as dielectric materials. Accordingly, as used herein and in the appended claims the term polymeric material refers to both thermosetting resins and to thermoplastic films.

However, dielectric materials used as insulators for electrical conductors may fail as a result of corona occurring when the conductors and dielectrics are subjected to voltages above the corona starting voltage. This type of failure may occur for example in certain electric motor applications. Corona induced failure is particularly likely when the insulator material is a solid organic polymer. Improved dielectric materials having resistance to corona discharge-induced deterioration would therefore be highly desirable. For some applications, mica-based insulation systems have been used as a solution to the problem, whereby corona resistance is offered by the mica. Because of the poor physical properties inherent in mica, however, this solution has been less than ideal.

Solid, corona-resistant dielectric materials are particularly needed for high-voltage apparatus having open spaces in which corona discharges can occur. This is especially true when the space is over approximately 1 mil in thickness and is located between the conductor and the dielectric, or in the dielectric material itself, or is located between the dielectric and a second dielectric or between the latter and ground. The service life of the dielectric is much shorter when these gaps or spaces are present. This problem is exemplified by dynamoelectric machines such as AC motors in which corona-resistance is essential in wire insulation and use of conventional wire enamel is consequently precluded. Thus, for instance, when the design stress is above the coronainception threshold and the turn-to-turn or strand-to-strand dielectric strength required exceeds the capability of any known wire enamel which has been degraded by corona activity. The stator coil turn-to-turn corona resistant insulation therefore takes the form of glass-or mica-bonded resinous material as a bulky composite which effectively prevents corona degradation of insulation leading to motor failure in normal use. The glass or mica composite thus occupies space in the core which otherwise could accommodate additional copper and thereby reduce the size of the motor, generator or transformers.

Resins containing a minor amount of organo-metallic compound of either silicon, germanium, tin, lead, phosphorus, arsenic, antimony, bismuth, iron, ruthenium or nickel are disclosed by McKeown (U.S. Pat. No. 3,577,346) as having improved corona resistance. Corona lives of up to four hundred times that of polymers without the organo-metallic additive are disclosed. There is no mention, however, of the use of organosilicates or organoaluminates.

A composition having anti-corona properties is disclosed, by DiGiulio et al, in U.S. Pat. 3,228,883, to consist of a mixture of ethylene-alpha-olefin copolymer, a homo-or copolymer covulcanizable therewith and a non-hygroscopic mineral filler, such as zinc, iron, aluminum or silicon oxide. However, there is no appreciation whatsoever in this patent that the use of submicron-sized alumina or silica particles is necessary to achieve significant improvement in corona resistance. See tables below.

A molded epoxy resin composition which contains alumina and silica is disclosed by Linson, in U.S. Pat. No. 3,645,899, as having good weathering and erosion resistance, but appears to have no particular resistance to corona breakdown.

Epoxy resins containing significant amounts ofreactive organosiloxane derivatives are disclosed by Markovitz in U.S. Pat. Nos. 3,496,139 and 3,519,670. However, these materials are less than ideal since their high reactivity results in a diminished shelf-life, a characteristic often of considerable importance. Moreover, the amine silicones in the U.S. Pat. No. 2,496,139 are polysiloxanes which are made from difunctional and trifunctional silicones, that is, the silicon atoms have either two Si—O bonds and two Si—C bonds, or three Si—O bonds and a single Si—C bond. This is in distinct contrast to the present invention which, as seen below, employs silicates and aluminates, both of which exhibit only Si—O and Al—O bonding.

Epoxy resins containing metal acetylacetonates in amounts below 5% by weight are disclosed in U.S. Pat. No. 3,812,214, but these resins have no corona-resistant properties.

Polymeric resins containing silica and talc as fillers appear to be disclosed in U.S. Pat. 3,742,084 issued June 26, 1973 to Olyphant et al. However, there is no appreciation that subm-icron particle sizes are critical for improved corona resistance when silica is employed.

Likewise, resins containing submicron silica appear to be disclosed in U.S. Pat. No. 4,102,851 issued July 25, 1978 to Luck et al. However, silica is added only as a thixotropic agent and there is no appreciation or concern regarding corona-resistant properties.

Polyethylene resin with various fillers, including alumina and silica, appears to be disclosed in U.S. Pat. No. 2,888,424 issued May 26, 1959 to Precopio et al. But again, properties; the fillers, including such counterproductive materials for corona properties as carbon black, are added only to improve mechanical properties.

Resins containing submicron silica also appear to be disclosed in U.S. Pat. No. 2,697,467 issued Oct. 10, 1972 to Haughney. Like the patent to Luck et al., however, this patent discloses no appreciation or concern for corona-resistant properties.

Curable polyester resin compositions of unsaturated polyester resin and 0.1 to 20 weight percent of an organoaluminate compound are disclosed in U.S. Pat. No. 4,049,748 issued Sept. 30, 1977 to Bailey. Again, however, there is no disclosure of any corona-resistant characteristic and, in fact, the covered products have poor high-temperature dimensional stability because they necessarily contain from 10 to 80 weight percent vinyl resin. This characteristic alone would make these products unsuitable for use in electric motors and similar applications, but they are deficient in the additional respect that they are inherently quite lossy at normal electric motor operating temperatures because of their substantial unsaturated polyester resin content of 20 to 90 weight percent.

Thus, there is a continuing need for corona-resistant materials which are easily fabricated for use as electrical insulation and a further need for additives which can convert dielectric materials susceptible to corona damage to corona-resistant materials. Accordingly, it is the principal object of the present invention to provide a corona-resistant resin, useful in various electrical insulation forms to satisfy these long-felt needs.

Another important object of this invention is to use to best advantage the unique corona resistance of these novel materials in the design and construction of new lines of components of dynamoelectric machines and transformers.

SUMMARY OF THE INVENTION

The present invention provides a corona-resistant resin composition containing a polymeric material and an additive thereto of approximately 5% to approximately 40% by weight of either an organosilicate or organoaluminate compound, or submicron-sized particles or either alumina or silica. The additives are characterized by the common inclusion of either aluminum or silicon and, preferably, in that the aluminum and silicon are atomically bound only with oxygen. Either conventional or epoxy resins may be used in the invention, with, in the case of epoxy resins, the organo compounds serving also as reactive curing agents. Likewise, the polymeric material also includes thermoplastic film. Compositions containing the organoaluminate or organosilicate compounds are homogeneous, solution-type compositions whereas those containing silica or alumina particles are formed with the particles substantially uniformly disposed throughout the resin. The silica and alumina particles are preferably less than about 0.1 micron in size. Similarly, a method of providing corona-resistant insulation for an electrical conductor employs the above-mentioned composition.

This invention represents marked departures from the prior art in several respects. In particular, this invention is based upon a new concept of providing corona resistance beyond that known heretofore in such dielectric materials and insulators. It is also based upon our discovery that this result can be gained consistently without sacrificing other desirable properties of such products. Moreover, the shortcomings and drawbacks of prior art dielectric materials and insulators, such as poor high-temperature dimensional stability and marked lossy tendency, can be essentially totally avoided. The latter result is attributable to the fact that we have found that by eliminating both vinyl compounds and unsaturated polyester compounds, those two important defects can be avoided. Further, virtual elimination to less than about one weight percent, which herein and in the appended claims is referred to as "substantially free from" will serve to limit these undesirable characteristics to acceptable levels in accordance with this invention.

Another finding of ours is that the corona-resistant property of our products requires a minimum of five weight percent of the alumina powder, or the silica powder, or the organoaluminate, or the organosilicate additive. This also stands in contrast to the prior art in two basic respects. Thus, the aforesaid Bailey patent bars use of such powders and additionally sets a range of organoaluminate extending far below our critical minimum.

Still another novel aspect of this invention is the use of the above additives singly or together in the critical proportions in thermoplastic resins as well as thermosetting resins to establish our new corona-resistance property in a wide variety of candidate dielectric and insulator materials and products. It will be understood by those skilled in the art that, for example, alumina or silica powder of herein specified particle size can be used in accordance with this invention in insulator compositions containing substantial proportions or amounts of either vinyl resin or unsaturated polyester resin, or both, to provide in those materials our new corona-resistant property. Such use would be of real advantage in products intended for uses in which they would not be subject to temperatures at which the products become lossy to marked degree or lose their dimensional stability to the point that the function or operation of the equipment involved is adversely affected.

In accordance with this invention, the corona-resistant resin can be used to coat conductors or conductor wires or to impregnate laminated electrical insulation, thus providing superior electrical insulating systems. Further, strands of wires coated with such corona-resistant resin are wound to form turns and coils in which the insulation has corona resistance at least 10 times greater than conventional insulation used for this purpose. Still further, such novel coils have special utility in the construction of transformers and of dynamoelectric machine stators.

BRIEF DESCRIPTION OF THE DRAWINGS

A further and better understanding of this invention and its special features and advantages will be gained by those skilled in the art upon consideration of the following detailed description taken in conjunction with the drawings accompanying and forming a part of this specification, in which.

DETAILED DESCRIPTION OF THE INVENTION

Figure 1:
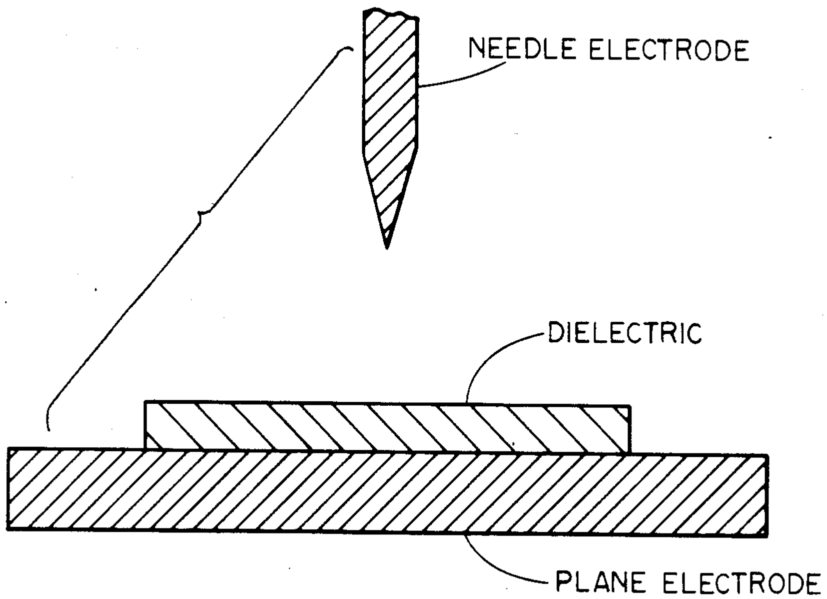
FIG. 1 is a schematic representation of the needle point corona test apparatus used to evaluate resin compositions formulated according both to the present invention and to conventional resin compositions so that resistance can be assessed and compared.

Resins useful for the practice of this invention include, for example, epoxy resins, polyester resins, and ester-imide resins. Epoxy resins formulated according to the invention require a curing agent as is the usual case with such resins. Useful thermoplastic films for the present invention include both polyamide films and polyimide films, such as Kapton(®). These films are used in their high-molecular weight state and do not require curing.

Typical of epoxy resins which can be used are resins based on bisphenol-A diglycidyl ether, epoxy novolac resins, cycloaliphatic epoxy resins, diglycidyl ester resins, glycidyl ethers of polyphenols and the like. These resins preferably have an epoxy equivalent weight of the order of 130–1500. Such resins are well known in the art and are described, for example, in many U.S. Pat. Nos. including 2,324,483; 2,444,333; 2,494,295; 2,500,600; and 2,511,913.

Catalytic hardeners, or curing agents, for the epoxy type resins, include aluminum acetylacetonate, aluminum di-sec-butoxide acetoacetic ester chelate or tetraoctylene glycol titanate in combination with phenolic accelerators, including resorcinol, catechol or hydroquinone and the corresponding dihydroxynaphthalene compounds. Compositions of this type have been described in U.S. Pat. Nos. 3,776,978 and 3,812,214. In the present invention, the organoaluminate catalysts can also serve as the reactive organoaluminum compound, but they are used in much higher amounts than heretofore disclosed in order to produce the corona-resistant product.

Also useful as curing agents for epoxy resins in the practice of this invention are polyester-polyacid resins, especially those with an acid number of 200–500. Those preferred have an acid number of 300–400.

Ester-imide resins useful in the practice of this invention include those used to coat magnet wire. Examples of compositions which may be used are disclosed in U.S. Pat. Nos. 3,426,098 and 3,697,471.

Organosilicate and organoaluminate compounds which can be used for the purposes of this invention include those compounds which are reactive toward epoxy groups of epoxy resins. The silicate and aluminate compounds are further characterized by containing only silicon-to-oxygen or aluminum-to-oxygen primary valence bonds. These compounds react to produce clear, hard resins containing Si—O or Al—O bonds throughout the body of the resin according to the strucutral formulas:

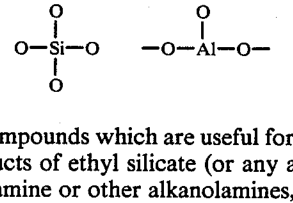

Typical of compounds which are useful for this purpose are the products of ethyl silicate (or any alkyl silicate) with ethanolamine or other alkanolamines, whereby an amino-functional organosilicate compound is produced. Organoaluminate compounds which can be used are aluminum acetylacetonate, aluminum di-sec-butoxide acetoacetic ester chelate, aluminum di-isopropoxide acetoacetic ester chelate, aluminum iso-propoxide stearate acetoacetic ester chelate, aluminum tri-isopropoxide or aluminum tri (sec-butoxide).

In the above-mentioned U.S. Pat. No. 3,496,139 issued to the present inventor, polysiloxanes are used in preparing the curing agents for the epoxy resins. However, in the present invention organosilicates are employed. Polysiloxanes are not organosilicates in which the silicon atoms exhibit only Si—O bonds. That is to say, the organosilicates of the present invention are made from tetrafunctional silicones. The epoxy resins cured by organosilicates are more strongly cross-linked than epoxy resins cured from polysiloxanes and therefore are better suited as corona-resistant compositions.

The organosilicate or organoaluminate can be used as the sole curing agent for the epoxy resin or can be used in combination with other known, typically used curing agents. For example, the phenolic accelerators, such as catechol, are necessary to properly cure epoxy resins when aluminum acetylacetonate is employed as an additive/hardener.

Epoxy resins specially suited for use in the present invention include those cured by an organosilicate which is the reaction product of ethyl silicate and ethanolamine and those cured by an organoaluminate which is either aluminum acetylacetonate or aluminum di-sec-butoxide acetoacetic ester chelate and accelerated by a phenolic such as catechol. Preferred polyester-imide resins include those modified by aluminum acetylacetonate. Presently preferred for use in this invention, however, is the polyester wire enamel marketed under the trademark ISONEL by Schenectady Chemical Co., which is a condensation product of esterification of aromatic dicarboxylic acid with a diol and cross linked with the trihydric alcohol known as THEIC which is tris (2-hydroxyethyl) isocyanurate.

In one embodiment of this invention, the corona-resistant composition comprises a conventional epoxy, or ester imide resin or other resin wherein there is dispersed alumina or silica particles of size less than about 0.1 micron. In this embodiment, the epoxy composition requires a curing agent specifically to set the resin. The curing system can be any of the usual polyamines, polyacids, acid anhydrides, or catalytic curing agents commonly used to cure epoxy resins; or a phenolic such as resorcinol or catechol can be used as an accelerator with a catalytic hardener selected from reactive organoaluminum, organotitanium, or organozirconium compound, of which tetraoctylene glycol titanate is typical as described in U.S. Pat. Nos. 3,776,978 and 3,812,214.

Preferably, the alumina or silica has a particle size of from approximately 0.005 to approximately 0.05 micron, as may be obtained either by the gas phase hydrolysis of the corresponding chloride or other halide, or as may be obtained by precipitation. These oxides, when disposed within the polymer material, form chain-like particle networks. Those oxide particles useful in the present invention and formed from the gas phase are also known as fumed oxides. Typical of commercially available fumed oxides are those manufactured and sold by the Cabot Corporation under the trade names Cabo-sil(®) (silica) or Alon(®) (alumina); or those made and sold by Degussa Corporation under the trade names Aerosil(®) (silica) or Aluminum Oxide C(®). Typical precipitated silicas which may be used include those manufactured and sold by the Philadelphia Quartz Co. under the trade name Quso(R) or those of PPG Industries sold under the trade name Lo-Vel(®).

From approximately 5% to approximately 40% by weight of organosilicate, organoaluminate, submicron silica or submicron alumina are used in the resin compositions of this invention, while loadings of 5% to approximately 30% by weight are preferred.

Preferred compounds of the organoaluminate and organosilicates are those which are soluble and which contain only Si—O or Al—O primary valence bonds on the silicon or the aluminum as was mentioned above. The use of these compounds produces clear resins, in which organoaluminate or organosilicate compounds are dissolved, and thus homogeneous with the resin.

As can be seen from the tables below the use of submicron particles is critical for the use of alumina and silica additives. Table I shows that polyimide films fail after an average of only 9 hours under the test conditions described herein and under the voltage stress shown. In stark contrast, the use of 20% dispersed alumina having an average particle size of approximately 0.020 microns produces average sample life in excess of 2776 hours. The use of 40% finely ground alumina having a particle size in excess of one micron produced better results than no additive but significantly worse results than the submicron sample.

TABLE I

| Sample | Stress Volts/Mil | Hours to Fail for Various Samples | Average |
|---|---|---|---|
| Polyimide film | 250 | 7, 8, 13 | 9 |
| Polyimide film with 20% alumina of 0.020 micron size | 250 | 2187, 3071+, 3071+ | 2776+ |
| Polyimide film with 40% alumina of greater than 1 micron size | 208 | 78, 130, 513, 310 | 258 |

The "+" sign in the tables indicates that the sample had still not failed at the time the data was taken.

Similar results are obtained with the use of a polyamide film with submicron alumina. These are summarized in Table II below:

TABLE II

| Sample | Stress Volts/Mil | Hours to Fail for Various Samples | Average |
|---|---|---|---|
| Polyamide film | 250 | — | 10 |
| Polyamide film with 20% alumina of 0.020 micron size | 250 | 629+, 629+, 629+ | 629+ |
| Polyamide film with 40% alumina of greater than 1 micron size | 357 | 629+, 629+, 629+ | 629+ |

The particles are disposed within the film material by conventional manufacturing methods prior to transformation to the high-molecular weight state.

Like results are obtained in the use of resins rather than the above-described films. These results are summarized in Tables III-A and III-B and in Tables III-AA and III-BB below. Except for the first entry illustrating epoxy resin "A" with no additives, Table III-A shows the corona test results when submicron alumina particles are used. In stark contrast Table III-B shows the results when the additive comprises particles having a size greater than one micron.

TABLE III-A

| Sample | Needle Point Corona Test, Hours to Failure: Range | Average |
|---|---|---|
| Epoxy resin "A", no additives | 18-32 | 25 |
| Epoxy resin "A" with 10% fumed silica of 0.013 micron size | No failures after 3,900 hours | 3,900+ |
| Epoxy resin "A" with 10% precipitated silica of 0.014 micron size | No failures after 3,900 hours | 3,900+ |
| Epoxy resin "A" with 10% fumed alumina of 0.03 micron size | No failures after 5,000 hours | 5,000+ |

TABLE III-AA

| Sample | Needle Point Corona Test Mean Time to Failure (60-Hz Eq. Hrs.): Range | Average |
|---|---|---|
| Epoxy resin "A", no additive | 900-1600 | 1,250 |
| Epoxy resin"A" with 10% fumed silica of 0.013 micron size | No failure after 195,000 | 195,000+ |
| Epoxy resin "A" with 10% fumed silica of 0.014 micron size | No failure after 195,000 | 195,000+ |
| Epoxy resin "A" with 10% fumed alumina of 0.03 micron size | No failure after 195,000 | 195,000+ |

TABLE III-B*

| Sample | Needle Point Corona Test, Hours to Failure: Range | Average |
|---|---|---|
| Epoxy resin "A" with 10% alumina (made from dehydrating $Al(OH)_3$ gel | 80-274 | 165 |
| Epoxy resin "A" with 10% kaolin ($Al_2O_3.SiO_2.2H_2O$) | 27-32 | 30 |
| Epoxy resin with 25% alumina | 48-66 | 59 |
| Epoxy resin with 31.5% alumina | 116-216 | 166 |
| Epoxy resin with 31.5% alumina (repeat of above experiment) | 110-218 | 162 |
| Epoxy resin with 25% silica | 29-39 | 34 |

The data of Tables III-A and Ill-B are restated in 60-Hertz equivalent hours in Tables III-AA (previous page) and III-BB (next page) to facilitate direct comparison of test results with those reported in the prior art.

TABLE III-BB*

| Sample | Needle Point Corona Test Mean Time to Failure (60-Hz Eq. Hrs.): Range | Average |
|---|---|---|
| Epoxy resin "A" with 10% alumina made from dehydrating $Al(0H)_3$ gel | 4,000-13,700 | 8,250 |
| Epoxy resin "A" with 10% kaolin ($Al_2O_3.SiO_2.2H_2O$) | 1,350-1,600 | 1,500 |
| Epoxy resin "A" with | 2,400-3,300 | 2,950 |

TABLE III-BB*-continued

| Sample | Needle Point Corona Test Mean Time to Failure (60-Hz Eq. Hrs.) Range | Average |
|---|---|---|
| 25% $Al_2O_3$ | | |
| Epoxy resin "A" with 31.5% $Al_2O_3$ | 5,800–10,800 | 8,300 |
| Epoxy resin "A" with 31.5% $Al_2O_3$ | 5,500–10,900 | 8,100 |
| Epoxy resin with "A" with 25% $SiO_2$ | 1,450–1,950 | 1,700 |

*All additives shown in Tables III-B and III-BB have particle sizes greater than one micron.

Thus it is seen from the tables above that resins too require the use of submicron alumina and silica particles to exhibit the wholly unexpected increases in corona-resistant properties shown. It is also apparent, upon comparing these test results with those expressed in the same terms in the table set out in columns 5 and 6 of U.S. Pat. No. 3,742,084 to Olyphant, et al, that the products of this invention are far superior to those of that patent. Incidentally, this direct comparison on Table III-AA and Table III-BB data with that of the said patent is based upon the general recognition in the art that statements of results of such accelerated corona breakdown tests under high frequency conditions are properly expressed in terms of 60-Hertz equivalent hours, as indicated in lines 27–34 of column B of the Olyphant, et al patent, the 3000 Hertz potential translating into a factor of 50 in converting the absolute values in hours increased in performing the tests resulting in the data of Tables III-A and III-B.

In another aspect, this invention relates to laminated electrical components which contain an organosilicate or an organoaluminate as part of the binder composition. For convenience, the organosilicate or organoaluminate containing composition may be dissolved in a solvent, e.g., methylene chloride, benzene, or methyl ethyl ketone and used as an impregnant for these laminate materials, e.g., polyester mats, ceramic paper, mica paper, glass web or the like.

In yet another aspect of the invention, a dispersion of the submicron silica or submicron alumina particles in resin is used to treat the laminate materials wherein the resin acts as a binder. The laminate may be prepared by coating a dispersion of the submicron silica or submicron alumina in resin or solvent between layers during the lay-up of the laminate. The laminates, after being subjected to heat and pressure under conventional conditions to cure the laminates, have greatly enhanced resistance to corona-induced deterioration and improved insulating properties.

In still another aspect, this invention relates to a conductor or conductor wire coated with a resin, i.e., epoxy, ester-imide, polyester, or other resin containing organoaluminate, organosilicate, submicron silica or submicron alumina particles, as described above. The coatings are applied in a conventional manner to give products exhibiting greatly enhanced resistance to corona-induced deterioration.

In using the resin compositions of this invention to provide insulated conductors resistant to corona-induced deterioration the conductor can be wrapped with an insulating paper, e.g., mica paper tape, impregnated with a resin composition of this invention.

The following examples depict in more detail the preparation and use of representative compositions in accordance with the principles of this invention. Standardized test conditions and apparatus, described as follows, were used in all of the examples hereinafter described.

The corona test apparatus, shown in FIG. 1, comprises a needle electrode, a plane electrode and a sample of dielectric material therebetween. The test consists of applying a potential of 2500 volts A.C. between the needle electrode and the plane electrode at a frequency of 3000 Hertz.

Dimensions of the samples used in the corona lifetime evaluations were standardized at 30 mils ($7.6\times10^{-2}$ cm.) thickness. The distance between the point of the needle and the surface of the dielectric was 15 mils ($3.8\times10^{-2}$ cm.). Corona lifetimes were determined in atmospheres of air and/or hydrogen. Test results, where data averages and ranges are given, are based on four to six samples of a given composition.

EXAMPLE 1

(a) Test of conventional thermoplastic resin composition—polyethylene terephthalate Polyethylene terephthalate resin film was stacked to a thickness of 30 mils and tested in the needle point electrode corona test apparatus depicted in the Figure and described above. The samples failed in 17–26 hours, with an average of 21 hours to failure.

(b) Test of conventional resin composition—aromatic polyimide

Under the conditions described above, an aromatic polyimide film (Kapton(®)) failed after an average of 41 hours.

(c) Test of conventional resin composition—cross-linked epoxy resin

Bisphenol-A diglycidyl ether epoxy resin with an epoxide equivalent of 875–1025 was cross-linked by a polyester-polyacid resin having an acid number of 340–360. A 30-mil film tested in accordance with the above, failed after 22 hours.

EXAMPLE 2

(a) Preparation of epoxy-reactive organosilicate

Ethanolamine (732 grams) was added to 624 grams of ethyl silicate 40 (a polysilicate having an average of 5 silicon atoms per molecule). The mixture, which was originally incompatible, became a clear and homogeneous solution upon heating. At the end of four hours of heating at 65°–185° C., 471.2 grams of liquid, which was mostly ethanol, had distilled from the reaction mixture. The mixture was heated at 99°–143° C. at a pressure of 2–3 millimeters of mercury for 65 minutes to remove unreacted ethanolamine (151 grams were collected). The residue, a liquid amino-functional silicate, was used as a hardener for epoxy resin compositions.

(b) Preparation and test of epoxy resin cured by epoxy-reactive silicate: A mixture was prepared from 80 parts by weight of epoxy resin CY 183, a cycloaliphatic epoxy resin having an epoxide equivalent of 147–161, and 20 parts by weight of amino-functional silicate prepared in (a), above. The mixture was cured to a clear, yellow solid. A film of the solid 30 mils in thickness was tested in the needle point electrode test apparatus of Example 1(a). The samples failed after 437–770 hours, with an average life to failure of 611 hours.

(c) Test of conventional epoxy-amino resin-cured with N-aminoethylpiperazine

The average time to failure of an epoxy resin cured with N-aminoethylpiperazine was 17 hours, with a range of 3–23 hours.

EXAMPLE 3

(a) Test of conventional epoxide resin

A resin was obtained from a mixture of bisphenol-A epoxy resin, resorcinol and tetraoctylene glycol titanate as described in U.S. Pat. No. 3,776,978, incorporated herein by reference thereto. This resin, at a thickness of 30 mils, failed after an average of 25 hours on the needle point electrode test; the range to failure was 18–32 hours.

(b) Preparation and test of epoxide resin and submicron silica filler

A composition was prepared from 90 parts by weight of resin prepared in (a), above, and 10.0 parts by weight of fumed silica (Cabosil(®) M-5, Cabot Corporation) having a particle size of about 0.013 micron. The resin cured without settling of the silica, that is, the cured resin had the submicron silica uniformly dispersed therethrough. Samples tested in the needle point electrode apparatus had not failed after more than 3900 hours.

(c) Preparation and test of epoxide resin and submicron silica filler

A composition obtained from 90.0 parts by weight of resin obtained in (a), above, and 10.0 parts by weight of microfine precipitated silica (Quso(®)G32, Philadelphia Quartz Co.), having a particle size of 0.014 micron, cured to a product which contained finely dispersed silica through the body of the resin. This product had not failed after more than 3900 hours in the needle point corona testing apparatus.

EXAMPLE 4

(a) Test of conventional resin cured with organoaluminate

Epoxy resins containing metal acetylacetonates as epoxy resin catalytic hardeners with phenolic accelerators were disclosed in U.S. Pat. No. 3,812,214. The metal acetylacetonate was limited to a maximum of 5.0% by weight of the epoxy resin. No disclosure of corona-resistance was made in the patent. Samples of this material failed within 40 hours in the needle point test due to the low metal acetylacetonate content.

(b) Preparation and test of epoxide resin containing organoaluminate

A clear homogeneous solution was prepared by dissolving aluminum acetylacetonate (25.0 parts by weight) and catechol (5.0 parts by weight) in 100.0 parts by weight of a liquid bisphenol-A epoxy resin having an epoxy equivalent weight of 180–188. The mixture was cured to a clear solid in which dissolved Al—O compounds were dispersed homogeneously. The Al content was 1.60% by weight. Samples tested in air by the needle point corona test failed after an average of 930 hours, with a range of 542–1360 hours to failure. The average lifetime increased to 2457 hours when tested in an atmosphere of hydrogen.

(c) Preparation and test of epoxy resin containing organoaluminate

A clear resin was prepared by curing a mixture of 100.0 parts by weight of a liquid bisphenol-A epoxy resin, 29.0 parts by weight of aluminum acetylacetonate and 5.0 parts by weight of catechol. The cured resin contained 1.80% of aluminum dissolved in the resin in the form of Al—O compounds. The average time to failure in the needle point electrode corona test was 2072 hours, with a range of 1500–3015 hours.

(d) Preparation and test of epoxy resin containing organoaluminate

A clear resin solution was obtained by dissolving 25.0 grams of aluminum acetylacetonate and 5.0 grams of catechol in 75.0 grams of a liquid bisphenol-A diglycidyl ether resin of epoxide equivalent weight 180–188. The solution was cured to a clear resin containing 1.98% of Al in the form of dissolved Al—O compounds. None of the samples failed in the needle point corona test after more than 1850 hours.

(e) Preparation and test of epoxy resin containing organoaluminate

Catechol (0.5 part by weight) and 40.0 parts by weight of aluminum di-sec-butoxide acetoacetic ester chelate were dissolved in 99.5 parts by weight of epoxy resin ERL 4221, a 3,4-epoxycyclohexylmethyl-3,4-epoxycyclohexane carboxylate epoxy resin with an epoxide equivalent weight of 131–143. The resin was cured to a clear solid containing 2.55% of Al in the form of dissolved Al—O compounds. The time to failure in the needle point electrode corona test was 1600 hours on the average, with a range of 1152–2045 hours.

EXAMPLE 5

(a) Test of conventional epoxy resin

See Example 3(a) for preparation. The average time to failure was 25 hours, with a range of 18–32 hours.

(b) Preparation and test of epoxy resin containing submicron alumina

Epoxy resin obtained according to Example 3(a) (94.0 grams) was mixed with 6.0 grams of fumed alumina (Alon(®), Cabot Corporation), obtained by hydrolysis of aluminum chloride in a flame process and having a particle size of about 0.03 micron. The mixture was cured without settling of the alumina particles. The average time to failure in the needle point electrode corona test was 275 hours, with a range of 169–423 hours.

(c) Preparation and test of epoxy resin containing fumed alumina

A sample was prepared from 90.0 parts by weight of the resin of Example 3(a) and 10.0 parts by weight of fumed alumina. The alumina particles did not settle during curing. Samples were removed from the needle point corona test apparatus after more than 5000 hours without failure.

EXAMPLE 6

(a) Preparation and test of laminate—epoxy-impregnated polyester

A laminate 30 mils in thickness made from 19 layers of polyester mat and the epoxy-polyester polyacid resin described in Example 1(c) was subjected to the needle point electrode corona test. The range of time to failure was 11-16 hours, with an average of 14 hours.

(b) Preparation and test of laminate—epoxy resin containing organoaluminate

The experiment of Example 6(a) was repeated using polyester mats treated first with a 20% solution of aluminum acetylacetonate in benzene, dried, and then treated with an epoxy-polyester polyacid resin as in (a). The samples failed after 154–458 hours of testing, with an average of 278 hours to failure.

(c) Preparation and test of laminate—epoxy-impregnated ceramic paper

A laminate made by pressing and curing three pieces of ceramic paper (nominal thickness 15 mils) impregnated with epoxy resin described in U.S. Pat. No. 3,812,214, herein incorporated by reference, failed after 168 hours, on the average, in the corona test apparatus. This occurred although the paper consisted mainly of alumina fibers.

(d) Preparation and test of laminate—ceramic paper impreqnated with epoxy-organoaluminate modified resin A laminate 30 mils thick was made from 3 layers of ceramic paper impregnated with the epoxy-aluminum acetylacetonate resin of Example 4(d). None of the cured samples failed after more than 1700 hours of testing.

(e) Preparation and test of laminate—ceramic paper impregnated with epoxy-fumed alumina composition A laminate of ceramic paper impregnated with a mixture of 90.0 parts by weight of epoxy-resorcinol-tetraoctylene glycol titanate according to Example 3(a) and 10.0 parts by weight of fumed alumina did not fail after more than 3800 hours in the needle point electrode corona test.

EXAMPLE 7

(a) Preparation test of conventional wire enamel

An ester-imide enamel, such as that described in U.S. Pat. Nos. 3,426,098 and 3,697,471, was cast to a thickness of 7 mils on a metal plate. A needle point electrode was placed above the sample with a gap of 15 mils between the needle and the surface of the enamel. The sample was tested at a stress of 2400 volts, 3000 Hz and 105° C. Failure occurred after an average of 13 hours.

(b) Preparation and test of organoaluminate-modified enamel

Ester-imide enamel modified by dissolution therein of 20% of aluminum acetylacetonate based on enamel solids (1.66% of Al based on dried solids) coated to a thickness of 7 mils on a metal plate failed after an average of 118 hours under the conditions described in (a), above.

(c) Preparation and test of submicron silica modified wire enamel

Ester-imide resin modified with submicron silica exhibits the same or greater improvement in corona resistance as in (b) above. Similar results are obtained when submicron alumina is added to the resin.

EXAMPLE 8

(a) Preparation and test of wrapped conductor-conventional resin

A conductor was insulated by wrapping a resin-rich mica paper tape (resin as in Example 3(a), above), to a total of 13 layers, around the conductor. The insulation failed after 1870 hours of testing at 190 volts/mil.

(b) Preparation and test of wrapped conductor-fumed alumina applied between layers A conductor, wrapped as in (a), above, except that a dispersion of 5.0% by weight of fumed alumina in methylene chloride was brushed between the layers of tape, was tested at a stress of 199-200 volts/mil. None of the samples had failed after 5064 hours of testing.

(c) Preparation and test of wrapped conductor-microfine silica applied between layers A conductor, wrapped as in (a), above, except that a dispersion of 5.0% by weight of microfine precipitated silica in methylene chloride was brushed between layers of tape, was tested in the needle point corona apparatus at 190–191 volts/mil. None of the samples failed after 5064 hours of testing.

EXAMPLE 9

In an experiment for the purpose of assessing the extent of corona-resistance enhancement of motor coils through the use of this invention, 12 four-strand coils were wound as usual in the production of motor coils. Copper wire of size 230×110 was used, being covered with Isonel wire enamel which in the case of six coils was filled with Alon alumina to the extent of 15%, while the Isonel wire enamel of the remaining coils contained no such filler. In all twelve cases the build of the wire in each coil was 230.5 mils and the wire enamel build was in each instance 2×2.5 for a total of 5. Each coil was provided with a covering bond strip of 2×2.5 build so that in the usual manner a total of 5 mils build was thereby added. Each coil was covered with a wrap, actually 3.5 wraps, of 2×7.5 each for an additional total build of 52.5 mils on the assembly. Glass tape was butt lapped in the usual way on each coil, adding another 14.0 mils to the build and making the total build of each coil 311.5 mils including 5 mils process allowance.

All 12 coils were then vacuum-pressure impregnated with epoxy resin and thereby sealed in accordance with presently prevailing commercial practice in the production of motor coils.

The resulting fully processed coils were proof-tested strand-to-strand at 10 KV-DC and placed on voltage endurance at 25%C at 5 KV-3000 Hertz (122 volts per mil). The individual values of strand breakdown at the various withdrawal times are set out in Table IV.

TABLE IV

| Time on Voltage Endurance (Hrs.) | Unfilled Wire Enamel | Alumina-Filled Wire Enamel |
|---|---|---|
| 0 | 15.7 | 16.3 |
| 199.2 | 5.36 | 11.1 |
| 414.5 | 4.42 | 15.1 |
| 814.5 | 2.0 | 12.7 |
| 1658.6 | 3.0 | 8.1 |
| 2004.6 | 1.5 | 8.0 |

It is accordingly apparent that the corona resistance of Isonel wire enamel is enhanced by the addition of 15% $Al_2O_3$, and that this characteristic is translatable directly into substantially improved motors and other electrical apparatus.

Figure 2:
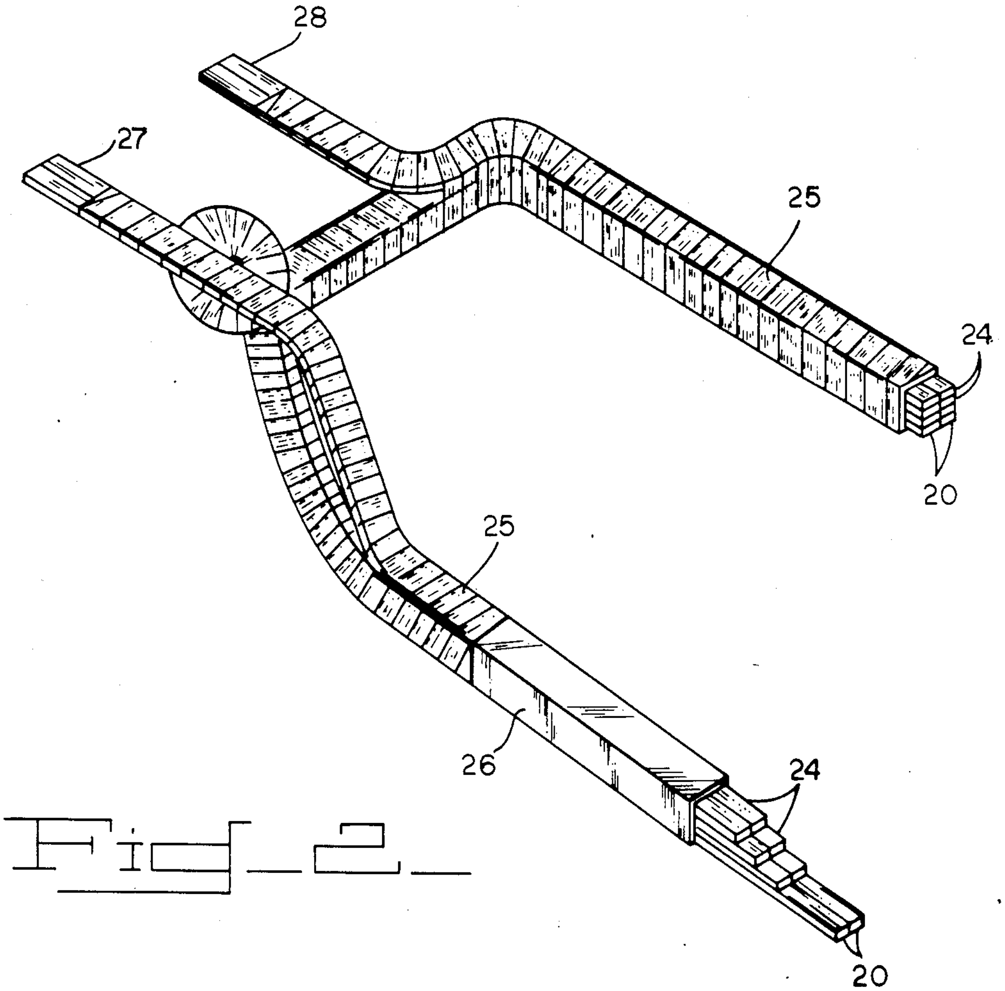
FIG. 2 is a fragmentary, perspective view of a form-wound stator coil, embodying this invention in a preferred form, parts being broken away for purposes of illustration.
Figure 3:
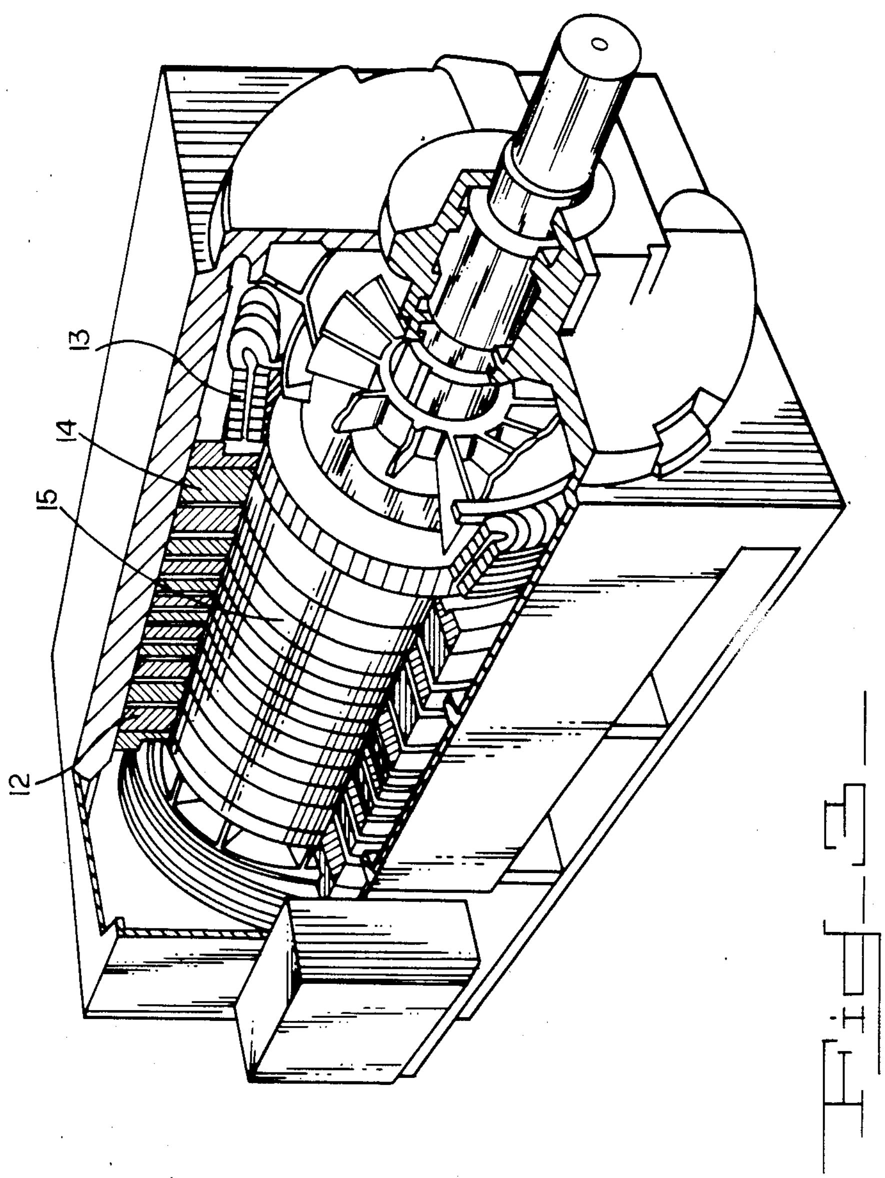
FIG. 3 is a fragmentary, perspective view of an AC motor incorporating this invention in a preferred form, parts being broken away again for purposes of illustration.

Dynamoelectric machines embodying this invention and consequently having by comparison with such machines known heretofore substantially greater power output are represented by AC motor 10 of FIG. 3. Stator 12 of this preferred embodiment of the present invention includes a plurality of coils 13 mounted and supported in the usual way in slots provided in stator core 14. Rotor 15 of the squirrel-cage induction type is assembled in the normal matter with stator 12 and journaled for rotation in response to electrical power delivered to the motor in the usual manner through leads (FIGS. 2) from a power source (not shown).

Stator coil 13, as shown in FIG. 2, is of the form-wound type made of rectangular cross section strands of copper wire 20 each of which has its own insulation in the form of a film-like coating of a resin composition of this invention described above. As indicated above, however, our present preference for this purpose is polyester wire enamel marked by Schenectady Chemical Company under the designation Isonel-200, a THEIC polyester, which in accordance with this invention we incorporate in substantially uniform distribution or dispersion about 15 weight percent of fumed alumina of particle size about 0.02 micron, this being a product of Degussa Corporation marketed under the trademark Aluminum Oxide C. This insulation is applied to each strand individually before laying up the strands in assembly and winding the coils. Thus, in this instance as an example, two strands 20 in parallel form provide turn 22 and four turns 22 provide coil 24. The ground wall insulation 26 in the form of the resin-bonded mica paper is wrapped around coil 24. An overlap of glass protective tape 25 completes the coil which is then ready for installation with similar coils in the stator body 14. By virtue of the unique corona resistance of the insulating coatings on the strands there is no necessity in this structure for thick-walled inorganic insulation to impart corona resistance even when the machine design stress is at a level which would require them in machines of this type known heretofore. As indicated above, this is very important to designers and builders of such dynamoelectric machines because it enables reduction in machine size without diminishing machine output capacity. In other words, the special new properties of this insulation of the present invention open entirely new and important opportunities in an old and crowded technological field and afford the basis for the new and better dynamoelectric machines and machine components described above and set forth in the appended claims.

Figure 4:
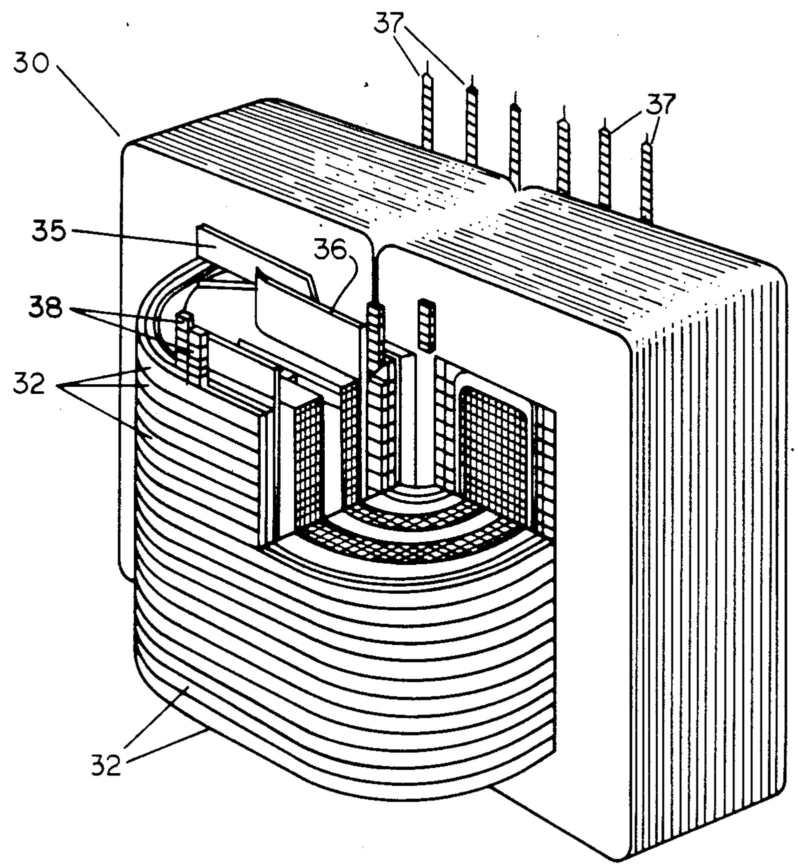
FIG. 4 is a viewing perspective of a shell-type distribution transformer, parts being broken away for purposes of illustration.

The general utility of this invention in the fabrication of electrical apparatus subject to corona discharge-induced degradation and consequent early failure of insulating coatings and coverings is further apparent from FIG. 4 which shows a distribution transformer embodying this invention. Thus, transformer 30 of the shell type comprises a plurality of pancake coils 32 stacked and mounted in shell 34. Coils 32 are provided in each instance with insulation in the form of resin-bonded mica paper which is wrapped around the copper ribbon to electrically separate each coil from adjacent coils. The paper is treated to impregnate it with a polyester wire enamel such as Isonel-200 containing 15% $Al_2O_3$ of 0.02 micron particle size prior to application to the copper ribbons forming the coils. As usual in this type of transformer construction, pressboard channels 35 and 36 are provided between coils 32 and iron of shell 34. High voltage leads 37 are connected to the high voltage windings while low voltage leads 38 serve the low voltage coils.

The special merits of transformers embodying this invention are obtainable independently of the particular type or kind of transformer involved so long as the voltage is at a level which will generate corona discharges within the transformer. Also, as indicated above, the new advantages and results of this invention are to be consistently gained or obtained whether the insulation is in the form of a coating or a wrapping of polyester wire enamel or other resin containing the requisite amount of fine particle $Al_2O_3$ or $SiO_2$.

In this specification and the appended claims where amounts, proportions or percentages are stated, reference is to the weight basis unless otherwise expressly specified.

While the invention has been described in detail herein in accord with certain preferred embodiments thereof, many modifications and changes therein may be affected by those skilled in the art. Accordingly, it is intended by the appended claims to cover all such modifications and changes which fall within the true spirit and scope of the invention.

The invention claimed is:

1. A method of providing an electric conductor wire with corona resistant insulation comprising covering at least a portion of the said wire wih a composition consisting essentially of polymeric material containing an amount of an additive providing corona resistance at least 10 fold greater than that of the polymeric material itself, said additive being selected from the group consisting of organoaluminate compounds, organosilicate compounds, silica of particle size from approximately 0.005 micron to approximately 00.05 micron, and alumina of particle size from approximately 0.005 micron to approximately 0.05 micron said polymeric material being a resin selected from the group consisting of polyimide, polyamide, polyester, and glycidyl ether of polyphenol epoxy resin.

2. A transformer component comprising a coil of a strand of copper wire insulated with polyester wire enamel containing between about 5% and 40% of an additve selected from the group consisting of alumina and silica of particle size between about 0.005 and 0.05 micron, said wire enamel having corona resistance 100 times greater than the same wire enamel containing none of the said additive.

3. The method of claim 1 wherein the polymeric material is a polyester wire enamel.

4. The method of claim 3 wherein an additive is alumina particles which comprises fumed alumina of particle size from approximately 0.005 micron to approximately 0.050 micron and said alumina particles are substantially uniformly distributed through said polymeric material.

5. The method of claim 1 wherein the additive is silica particles which comprise fumed silica of particle size from approximately 0.005 micron to approximately 0.050 micron and said silica particles are substantially uniformly disposed through the polymeric material.

6. The method of claim 1 wherein the additive is silica particles which comprise precipitated silica of aprticle size from approximately 0.005 micron to approximately 0.050 micron and said silica particles are substantially uniformly distributed through saisd polymeric material.

7. A dynamoelectric machine comprising a rotor, and a stator including a plurality of coils each of which comprises a plurality of conductor strands coated with an electric insulating composition consisting essentially of polymeric material containing an additve selected from the group consisting of alumina and silcia of particle size from approximately 0.005 to 0.05 micron in amount effective to increase the corona resistance of the said polymeric material by at least 10 fold, said polymeric material being selected from the group consisting of polyimide, polyamide, polyester, and glycidyl ether of polyphenol epoxy resin.

8. A machine of claim 7 in which said additive is in amount effective to increase the corona resistance of the polymeric composition by at least 100 fold.

9. A machine of claim 8 in which the additive is alumina in amount from approximately 5% to 40% by weight of the corona-resistant insulation.

10. A machine of claim 8 in which the additive is silica in amount from approximately 5% to 40% by weight of the same corona-resistant insulation.

11. A dynamoelectric machine component having unique corona resistance which comprises a coil formed of a strand of electrically conductive wire insulated with a composition consisting essentially of polymeric material containing an additive selected from the group consisting of alumina and silica of particle size from approximately 0.005 to 0.05 micron in amount effective to increase the corona resistance of the said polymeric material by at least 10 fold, said polymeric material being a resin selected from the group consisting of polyimide, polyamide, polyester, and glycidyl ether of polyphenol epoxy resin.

12. The component of claim 11 in which the coil is formed of a plurality of strands of copper wire of rectangular cross section wound in parallel to form a turn and in which the strands each are insulated with polymeric material in the form of a film-like coating of polyester wire enamel and containing in each instance an amount of silica or alumina of particle size from about 0.005 to about 0.05 micron imparting corona resistance to the insulation which is at least 10 times greater than that of the polymeric insulating material itself.

13. The component of claim 11 in which the additive is fumed alumina of about 0.02 micron particle size.

14. The component of claim 11 in which the additive is in amount about 15% by weight of the.

15. The component of claim 11 in which the additive is fumed alumina of particle size about 0.02 micron and is in amount about 15% by weight of the insulation and in which the insulation is polyester wire enamel.

16. An electrical conductor coverd with an insulating coating consisting of a polyester wire enamel and alumina filler, said alumina filler being of particle size from about 0.005 to 0.05 micron and in amount from about 5% to 40% by weight of the insulating coating.

17. The conductor of claim 16 in which the alumina filler is of particle size about 0.02 micron and in amount about 15% by weight of the insulation.

* * * * *